E. J. KEARNEY & T. TRECKER.
ATTACHMENT FOR MILLING MACHINES.
APPLICATION FILED JUNE 27, 1908.
995,683.
Patented June 20, 1911.
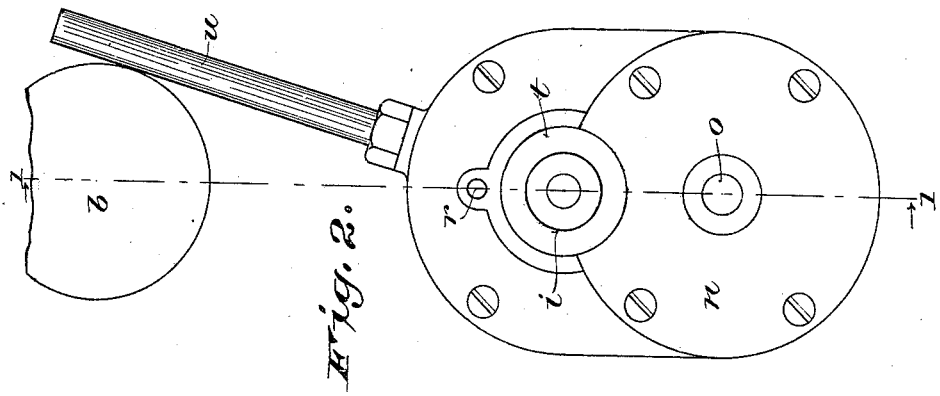
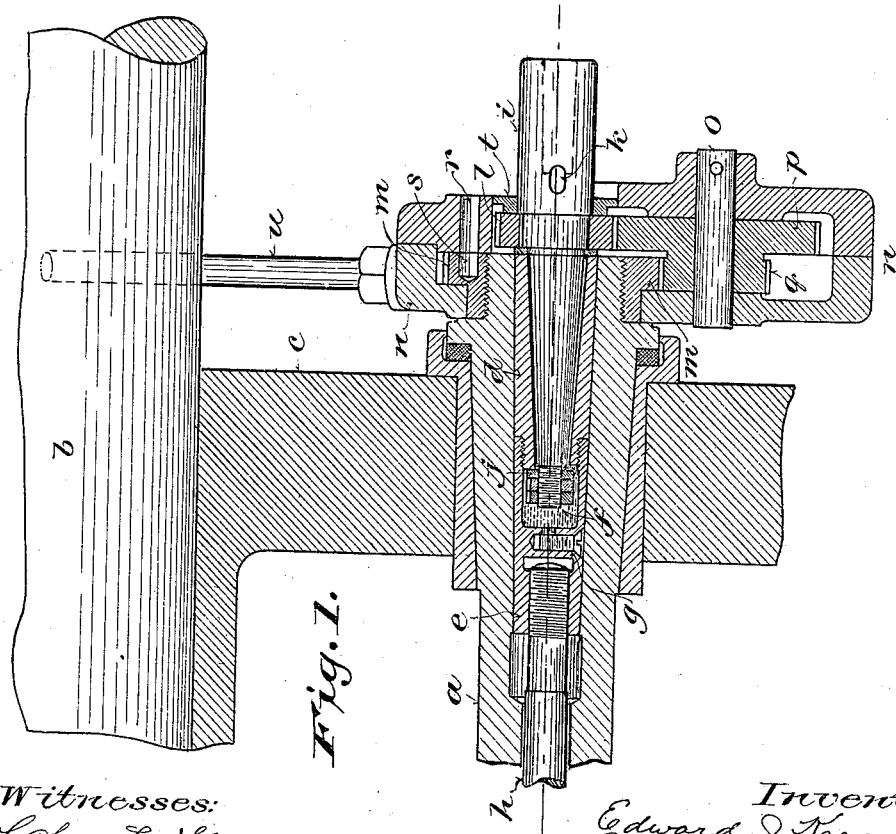
Witnesses:
Chas. L. Goss.
Alice E. Goss
Inventors:
Edward J. Kearney
Theodore Trecker
By Winkler Flanders Bottum & Fawcett
Attorneys.

UNITED STATES PATENT OFFICE.

EDWARD J. KEARNEY, OF WAUWATOSA, AND THEODORE TRECKER, OF WEST ALLIS, WISCONSIN, ASSIGNORS TO KEARNEY & TRECKER COMPANY, OF WEST ALLIS, WISCONSIN, A CORPORATION OF WISCONSIN.

ATTACHMENT FOR MILLING-MACHINES.

995,683.   Specification of Letters Patent.   Patented June 20, 1911.

Application filed June 27, 1908. Serial No. 440,656.

*To all whom it may concern:*

Be it known that we, EDWARD J. KEARNEY and THEODORE TRECKER, citizens of the United States, residing at Wauwatosa and West Allis, respectively, in the county of Milwaukee and State of Wisconsin, have invented certain new and useful Improvements in Attachments for Milling-Machines, of which the following is a specification, reference being had to the accompanying drawing, forming a part thereof.

The main objects of this invention are to provide a milling machine with a removable attachment comprising a spindle for small cutters and mechanism for driving the same from the main spindle at a higher speed; to adapt the attachment for use interchangeably on a horizontal or vertical spindle; to support the attachment independently of the main frame and gearing for driving the main spindle, so that it can be readily applied to and removed from the machine without disturbing other parts thereof; to make ample provision for thorough lubrication of the high speed spindle; and generally to improve the construction and operation of attachments of this class.

It consists in certain novel features of construction and in the peculiar arrangement and combinations of parts as hereinafter particularly described and pointed out in the claims.

In the accompanying drawing like characters designate the same parts in both figures.

Figure 1 is a vertical section on the line 1, 1, Fig. 2, of an attachment embodying the present invention as applied to a horizontal spindle; and Fig. 2 is an end elevation as viewed from the right with reference to Fig. 1.

For the purpose of illustration and explanation, the attachment is shown in connection with parts of a horizontal milling machine, although it is equally applicable to vertical milling machines.

Referring to the drawing, $a$ designates a part of the main spindle, which is tubular or hollow or formed with a taper hole or bore at one end, $b$ a part of the overarm, and $c$ a part of the frame of a horizontal milling machine, all of which are or may be of the usual construction.

$d$ is a taper sleeve or bearing removably fitted in the taper hole or bore of the main spindle $a$. It has a detachable member or section $e$, threaded thereon and formed with a recess or chamber $f$, for oil or other lubricant supplied thereto through an opening which is closed by a screw or plug $g$. At its inner end the member $e$ is formed with a threaded socket for engagement with a rod $h$ passing through the bore of the main spindle, and serving to draw the bearing $d$ tightly into place in the spindle $a$ and to force it out of the same.

Within the taper bore of the bearing $d$ the taper shank or journal of the high speed or auxiliary spindle $i$ is fitted to turn, and it is held therein by a thrust collar $j$ and by nuts threaded on its inner end. In its outer end the spindle $i$ is formed with the usual taper hole or socket to receive the tools, and with a drift hole $k$ for removing them, and it is provided adjacent to the outer end of the bearing $d$ with a gear $l$.

On the outer end of the main spindle $a$, a removable driving gear $m$ is threaded, and upon the hub of this gear is fitted and held a gear case or frame $n$ made in two parts or sections, which may be fastened together by screws, as shown in Fig. 2. Within this case or frame are journaled on a pin $o$, two rigidly connected gears $p$ and $q$, the larger gear $p$ meshing with the gear $l$, and the smaller gear $q$ meshing with the gear $m$. The driving gear $m$ is held and has a working fit between the two parts of the gear case, the outer section of which is formed with a hole $r$, registering with a hole or socket $s$ in the gear to receive a pin for unscrewing the gear from the spindle $a$. The outer part of the case is also formed with an opening of sufficient size to permit the withdrawal of the bearing $d$ with the spindle $i$ and its gear $l$, without removing other parts of the attachment. This opening is closed when the high speed spindle is in place by a ring or collar $t$ surrounding the spindle.

The gear case is provided with a stop arm or rod $u$, which by engagement with the overarm $b$, as shown, or other stationary part of the machine, prevents said case from turning with the spindle $a$. This arm or rod is made detachable as shown, so that it may be removed and the gear case may be turned for unscrewing the gear $m$ from the spindle $a$, the latter being held against rotation and a pin being inserted through the hole r into the socket s. The gears of the train connecting the auxiliary spindle i with the main spindle a are made as shown, to drive the auxiliary spindle at a higher rate of speed, but obviously may be made to drive it at any desired rate relative to the main spindle.

By mounting the attachment as shown, upon the main spindle independently of the frame and main gearing, it can be easily and quickly applied to and removed from the machine without affecting or disturbing the frame or main gearing. The enlarged opening in the outer side of the gear case n around the spindle i permitting the withdrawal of said spindle with its bearings d and gear l without removing other parts of the attachment, saves time whenever for any reason it is necessary to temporarily remove the auxiliary spindle without disturbing other parts of the attachment.

Various changes in the details of construction and arrangement of parts may be made without departing from the principle and scope of the invention.

We claim:

1. An attachment for milling machines comprising a driving gear adapted to be removably secured on the main tool spindle of a milling machine, a gear case mounted on the hub of said driving gear which is fitted to turn therein and removable therewith from the main spindle, an auxiliary tool spindle provided with a gear and with a sleeve bearing which is removably fitted in the main spindle, and gears mounted in said case and connecting said driving gear with the gear on said auxiliary spindle.

2. An attachment for milling machines, comprising an auxiliary spindle removably and revolubly fitted in the main spindle of a milling machine and provided with a gear, a driving gear adapted to be removably mounted on said main spindle, a gear case or frame in which said driving gear is rotatably mounted, means for preventing rotation of said case or frame with the main spindle, and gears carried by said case or frame for connecting the gear on the auxiliary spindle with the gear on the main spindle, substantially as described.

3. An attachment for milling machines, comprising an auxiliary spindle removably fitting and adapted to turn in the main spindle of a milling machine and provided with a gear, a driving gear adapted to be removably mounted on said main spindle, gears connecting the gear on the auxiliary spindle with said driving gear, and a gear case or frame containing said gears and having an opening of sufficient size to permit the withdrawal therefrom of the auxiliary spindle and its gear, substantially as described.

4. An attachment for milling machines, comprising a sleeve bearing removably fitted in the bore of the main spindle of a milling machine and composed of separable members joined end to end and forming a lubricant chamber at their adjoining ends, an auxiliary spindle fitted to turn in said bearing, and means for rotating said auxiliary spindle relative to the main spindle, substantially as described.

5. An attachment for milling machines, comprising a sleeve bearing removably fitted in the bore of the main spindle of a milling machine and composed of separable members joined end to end and forming a lubricant chamber which has a filling opening, a removable closure for said opening, an auxiliary spindle fitted to turn in said bearing and secured therein by means within said chamber, and means for rotating the auxiliary spindle relative to the main spindle, substantially as described.

6. In combination with the hollow main spindle of a milling machine, a sleeve bearing removably fitted in said main spindle, a rod adapted to pass longitudinally through the main spindle for securing said bearing therein, and an auxiliary spindle fitted to turn in said bearing and removable therewith from the main spindle, substantially as described.

7. In combination with the hollow main spindle of a milling machine, a taper sleeve bearing removably fitted in said main spindle, a rod having a detachable threaded connection with said bearing and adapted to pass therefrom through the bore of said spindle for drawing said bearing into and thrusting it from said spindle, and an auxiliary spindle fitted to turn in said bearing and removable therewith from the main spindle, substantially as described.

8. In a milling machine the combination with the hollow main spindle, of a driving gear adapted to be removably secured on the main spindle, an auxiliary spindle removably fitted and adapted to turn in said main spindle independently of said gear and provided with a gear, gears for connecting the gear on said auxiliary spindle with the gear on the main spindle, and a gear case or frame carrying said connecting gears and mounted on the hub of the driving gear which is fitted to turn therein and is removable therewith from the main spindle, substantially as described.

9. In a milling machine the combination with the hollow main spindle, of a driving gear removably threaded on said main spindle and having a hole or socket, an auxiliary spindle removably fitted and adapted to turn in the main spindle and provided with a gear, gears for connecting the gear on the auxiliary spindle with the gear on the main spindle, and a case or frame carrying said connecting gears and having a hole arranged to register with the hole or socket in the driving gear for the insertion of a pin to unscrew said gear from the main spindle, substantially as described.

10. In a milling machine the combination with the main spindle which has an axial bore, a taper sleeve bearing removably fitted in the bore of the main spindle, means for securing said bearing in said spindle, a driving gear adapted to be removably secured to the protruding end of the main spindle, a high speed spindle having a taper journal fitted to turn in said bearing and provided with a gear, gears for connecting the gear on the high speed spindle with the driving gear on the main spindle, a gear case or frame mounted on the hub of the driving gear and carrying the connecting gears, and means for preventing rotation of said case or frame with the main spindle, substantially as described.

In witness whereof we hereto affix our signatures in presence of two witnesses.

EDWARD J. KEARNEY.
   THEODORE TRECKER.

Witnesses:
 P. M. TALLON,
 M. E. ROONEY.

---

Copies of this patent may be obtained for five cents each, by addressing the "Commissioner of Patents, Washington, D. C."